April 30, 1946.  C. W. METZGER ET AL  2,399,372
ROTARY CUTTING TOOL
Filed May 11, 1943  2 Sheets-Sheet 1
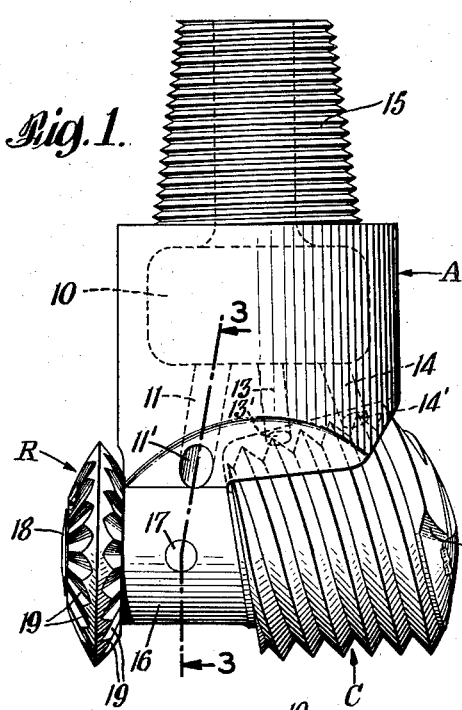
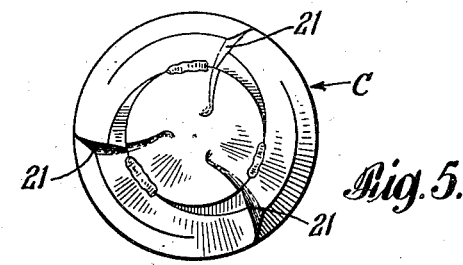
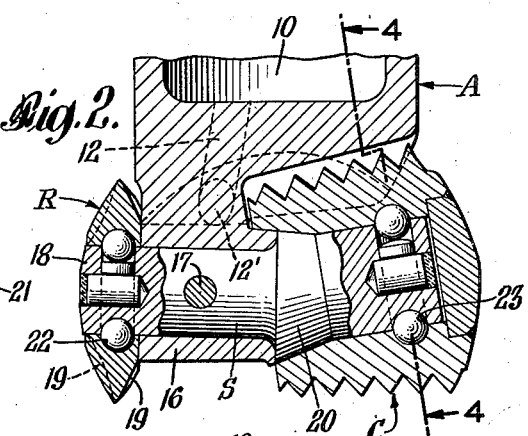
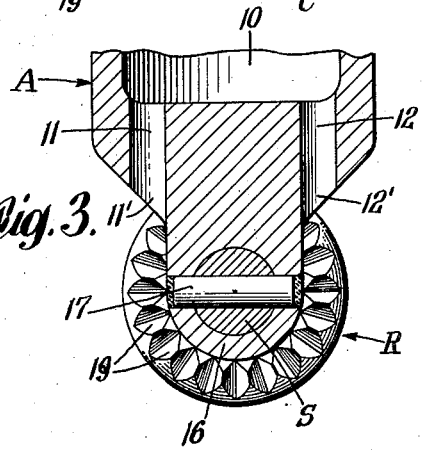
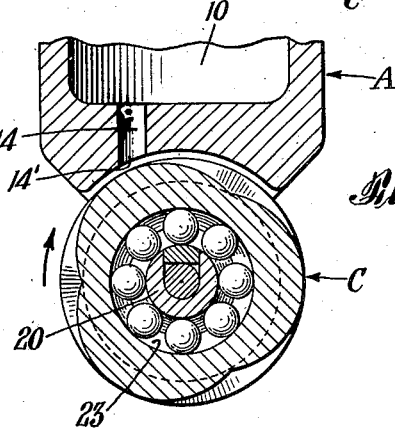
INVENTORS
CLAUDE W. METZGER
PAUL R. SNETCHER
BY
ATTORNEY Patented Apr. 30, 1946

2,399,372

UNITED STATES PATENT OFFICE 2,399,372

ROTARY CUTTING TOOL

Claude W. Metzger, Houston, Tex., and Paul R. Snetcher, Oklahoma City, Okla., assignors to Haynes Stellite Company, a corporation of Indiana Application May 11, 1943, Serial No. 486,488

5 Claims. (Cl. 255—71)

This invention relates to rotary cutting tools used in drilling deep wells such as oil wells.

In deep well drilling, various types of earth and rock formations, some hard, some soft, and some conglomerate must be passed through. Ordinarily it has been customary to use one drill for penetrating hard formations and another for penetrating soft formations. This practice is wasteful of time, labor and money but has been made necessary by the limitations of the drills used. For example, drilling tools equipped with disc shaped cutters designed to penetrate soft formations are unsatisfactory for drilling hard formations, the dragging action of the sides of the discs against the hole being drilled wearing the discs flat, causing deviation from a straight line hole. On the other hand, tools provided with teeth for penetrating hard formations are unsatisfactory for use in drilling soft formations, the soft material tending to become packed between the teeth and thus interfering with the drilling action.

Objectives in well drilling have been the drilling of holes of small diameter to great depth. Improvements in drilling machinery have made it possible to drill deeper holes of smaller diameter, but the design of drilling tools has not kept pace with these developments. Many drilling tools which have proved efficient in the past are unsatisfactory for drilling the small holes desired because of their large size, which interferes with the circulation and return of cuttings, and the fact that their design does not lend itself to being scaled down to as small a diameter as desired. There is consequently a demand for a small diameter drilling tool having provision for efficient removal of cuttings from the hole being drilled.

It is an important object of this invention to provide a rotary cutting tool for use in small hole deep well drilling, which tool may be used for penetrating hard or soft or conglomerate earth and rock formations. Another object of the invention is a drilling tool capable of passing through various types of earth and rock formations without deviation from a straight line, and a further object is a well drilling tool provided with improved means for removing cut material from the hole.

The invention by means of which these objects are achieved is an improved rotary cutting tool for drilling wells in earth and rock and comprises a drill body on which is mounted a single rotatable helical cutter and a single reamer blade. A preferred form of construction of the tool is illustrated in the accompanying drawings in which:

Fig. 1 is a front elevation of an assembled cutting tool;

Fig. 2 is a sectional view of the lower portion of the tool shown in Fig. 1;

Fig. 3 is a sectional view of the lower portion of the tool shown in Fig. 1 taken along the line 3—3 in Fig. 1 looking in the direction of the arrows;

Fig. 4 is a sectional view of the lower portion of the tool shown in Fig. 1 taken along the line 4—4 in Fig. 2 looking in the direction of the arrows;

Fig. 5 is an end view of the helical cutter forming a part of the tool shown in Figs. 1 and 2;

Fig. 6 is an end view of the reamer disc forming a part of the tool shown in Figs. 1, 2, and 3;

Figure 7:
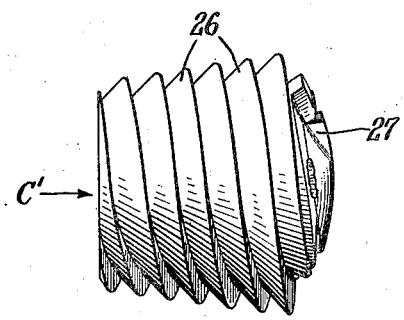
Fig. 7 is a front elevation of an alternate form of helical cutter.

Referring to the drawings, the tool of this invention comprises a tool body A which is provided in conventional manner, as shown for instance in Figs. 4 and 5 of Metzger patent 1,886,570, with a chamber 10 for water. From the chamber 10, water courses 11, 12, 13, 14 lead through the tool body A to outlets 11', 12', 13' and 14' to permit flushing the cutter and the hole being drilled. One end 15 of the tool body A is threaded to fit a conventional rotary drill driving apparatus. The other end of the tool body A is provided with a downwardly extending projection 16 to which, in the preferred form of construction illustrated, is fixedly supported, as by a pin 17, a spindle S extending on either side of the projection 16. One end 18 of the spindle S serves as a supporting shaft for a rotatable reamer disc R provided with corrugations 19 on both disc faces. The other end 20 of the spindle S tilts about 10° from vertical to the axis of the tool body A and serves as a supporting shaft for a rotatable helical cutter C. The helical cutter C comprises a threaded body, preferably a truncated cone with a taper of about 8° from its symmetrical axis, one end of which is provided with reamer teeth 21. The cutter C is provided with multiple, preferably triple, helical threads having 30° teeth with a pitch of about two inches. Because the cutter C is in the form of a truncated cone, spiral helices are formed by these threads. Both the cutter C and the reamer R are supported by bearing balls within grooved races 22, 23 on the spindle S.

Figure 8:
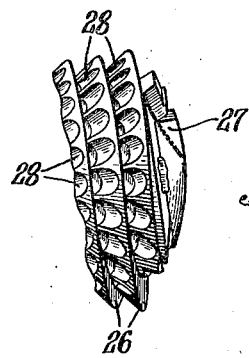
Fig. 8 is a front elevation of a portion of a modified form of helical cutter.
Figure 9:
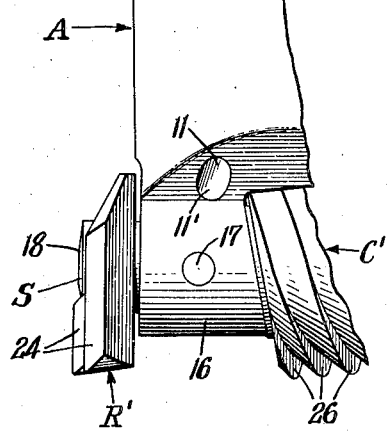
Fig. 9 is a front elevation of a portion of an assembled cutting tool provided with a helical cutter of the form shown in Fig. 7 and with an alternate form of reamer blade.
Figure 10:
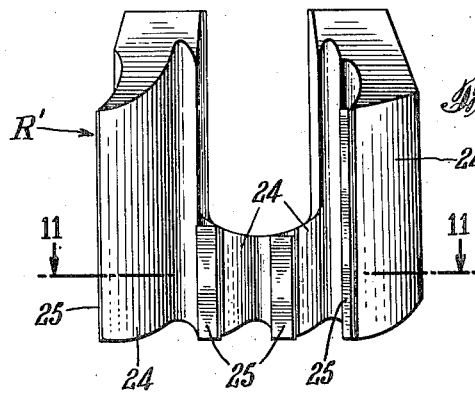
Fig. 10 is an end view of the reamer blade forming a part of the tool shown in Fig. 9.
Figure 11:
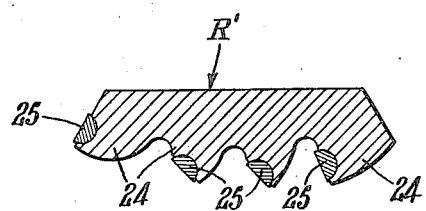
Fig. 11 is a sectional view of the reamer blade shown in Fig. 10 taken along the line 11—11 and looking in the direction of the arrows.

Although the form of construction just discussed and illustrated for example in Figs. 1 and 2 is preferred, minor changes in construction may be made without departing from the invention and without losing its advantages provided the reamer and cutter are mounted on opposite sides of the tool body. For instance, instead of mounting a separate spindle in the projection 16 of the tool body A (Figs. 1 and 2) the tool body, projection, and spindle may be made all in one piece, or a projection provided with two shaft-like extensions may be welded or otherwise fixed to the tool body A. Also it is not necessary that the reamer and cutter have the precise forms shown in Figs. 1 to 6, inclusive. Thus, a nonrotating reamer blade R' (Figs. 9 and 10) provided with teeth 24 preferably having inserts 25 of the hard metal carbide type may be employed, being welded to the spindle S. An alternate form of cutter C' (Fig. 7), is provided with multiple lead threads 26 of the buttressed or Harvey type and reamer teeth 27. And to increase the shearing action of the cutter teeth of the cutters C or C', a series of grooves 28 (Fig. 8) may be formed on one side of each thread, preferably on the side facing the tool body A.

In use, the tool of the invention is attached to driving apparatus in the usual manner so as to cause it to revolve about its vertical axis. The reamer disc R or blade R' and the reamer teeth on the cutter C or C' bear against the sides of the hole being drilled. The cutter C or C' is caused by frictional contact with the bottom of the hole to rotate about the shaft formed by the end 20 of the spindle S, and the cutting edges of the threads formed by the triple helix bear against the bottom of the hole with a chisel-like or slicing action with little or no dragging action, cutting grooves which cross those cut in previous revolutions of the tool, rather than "tracking" in the same grooves. The rotation of the cutter C or C' causes broken material to be conveyed toward the center of the hole. Water is circulated from the chamber 10 through the water courses 11, 12, 13, 14 to wash the threads of the cutter and the bottom of the hole. The circulating water assists the movement of cuttings to the center of the hole, and the washing action on the bottom of the hole serves to wash out soft material leaving hard material to be broken by the cutter. Water and cuttings are removed from the hole in conventional manner.

Because there is little or no dragging action on the cutter of the tool of the invention, wear on the cutting threads is reduced to a minimum, and deviation from a straight line hole is inhibited. The fact that by successive revolutions grooves are cut across previously cut grooves leads to more rapid cutting. The conveyor-like action of the cutter and the washing action of the circulating water prevent the packing of cuttings between the threads of the cutter and thus insure good cutting action in soft material. The design of the tool is such that it may readily be made of small diameter allowing enough clearance between it and the sides of the hole being drilled for the easy removal of cuttings and yet have sufficient strength to withstand the severe use for which it is intended.

It is preferred that the cutting threads of the cutter and the reamer teeth of the reamer employed in the tool of the invention be protected from undue wear by hard facing them with a wear-resistant material, for instance of the cobalt-chromium-tungsten alloy type. For best results, if a reamer blade of the nonrotating type is used, hard inserts should be welded to the reamer teeth, as pointed out above.

We claim:

1. A rotary cutting tool for deep well drilling comprising a tool body; a projection on one end of said body, displaced from the longitudinal axis thereof; a spindle underlying said body and mounted in said projection and extending outwardly of opposite sides thereof substantially normal thereto on the side farthest from said axis and at an angle from the normal to said axis on the other side thereof; a reamer mounted on said spindle on the side of said projection farthest from said axis and extending beyond the side of said body; a truncated cone cutter mounted on said spindle on the other side of said projection with its smaller end next to the projection and substantially at said axis and with its larger end extending beyond the side of the tool body, the cutting edge of said truncated cone cutter being arranged as a multiple thread helical screw; and reamer teeth on the larger end of said truncated cone cutter.

2. A rotary cutting tool for deep well drilling comprising a tool body; a projection on one end of said body, displaced from the longitudinal axis thereof; a spindle underlying said body and fixedly mounted in said projection and extending outwardly of opposite sides thereof substantially normal thereto on the side farthest from said axis and at an angle from the normal to said axis on the other side thereof; a reamer disc rotatably mounted on said spindle on the side of said projection farthest from said axis and extending beyond the side of said body, said reamer disc having two convex circular surfaces meeting to form a circular cutting edge, each of said surfaces having radially disposed adjacent grooves; a truncated cone cutter mounted on said spindle on the other side of said projection with its smaller end next to the projection and substantially at said axis and with its larger end extending beyond the side of the tool body, the cutting edge of said truncated cone cutter being arranged as a multiple thread helical screw; and reamer teeth on the larger end of said truncated cone cutter.

3. A rotary cutting tool for deep well drilling comprising a tool body; a projection on one end of said body; displaced from the longitudinal axis thereof; a spindle underlying said body and fixedly mounted in said projection and extending outwardly of opposite sides thereof substantially normal thereto on the side farthest from said axis and at an angle of about 10° from the normal to said axis on the other side thereof; a reamer mounted on said spindle on the side of said projection farthest from said axis and extending beyond the side of said body; a truncated cone cutter having a taper of about 8° from its symmetrical axis mounted on said spindle on the other side of said projection with its smaller end next to the projection and substantially at said axis and with its larger end extending beyond the side of the tool body, the cutting edge of said truncated cone cutter being arranged as a multiple thread helical screw; and reamer teeth on the larger end of said truncated cone cutter.

4. A rotary cutting tool for deep well drilling comprising a tool body; a projection on one end of said body, displaced from the longitudinal axis thereof; a spindle underlying said body and mounted in said projection and extending outwardly of opposite sides thereof substantially normal thereto on the side farthest from said axis and at an angle the normal vertical to said axis on the other side thereof; a reamer disc rotatably mounted on said spindle on the side of said projection farthest from said axis and extending beyond the side of said body; a truncated cone cutter mounted on said spindle on the other side of said projection with its smaller end next to the projection and substantially at said axis and with its larger end extending beyond the side of the tool body, the cutting edge of said truncated cone cutter being arranged as a buttress-threaded multiple thread helical screw; and reamer teeth on the larger end of said truncated cone cutter.

5. A rotary cutting tool for deep well drilling comprising a tool body provided with flushing water courses; a projection on one end of said body, displaced from the longitudinal axis thereof; a spindle underlying said body and fixedly mounted in said projection and extending outwardly from opposite sides thereof substantially normal thereto on the side farthest from said axis and at an angle about 10° from the normal to said longitudinal axis on the other side of said projection; a reamer disc, having two convex surfaces meeting to form a cutting edge and provided with radially disposed adjacent grooves, rotatably mounted on said spindle on the side of said projection farthest from said axis and extending beyond the side of said body; a truncated cone cutter, having a taper of about 8° from its symmetrical axis, rotatably mounted on said spindle on the other side of said projection with the smaller end next to the projection and substantially at said axis and with the larger end extending beyond the said tool body; and, on said cone, cutting edges arranged as a buttress-threaded triple-thread helical screw, the buttress side of each of such threads being provided with outwardly extending grooves.

CLAUDE W. METZGER.
PAUL R. SNETCHER.